Sept. 2, 1941.  G. AUKLAND  2,254,787
TRACTOR TIRE
Filed Sept. 29, 1939   2 Sheets-Sheet 1
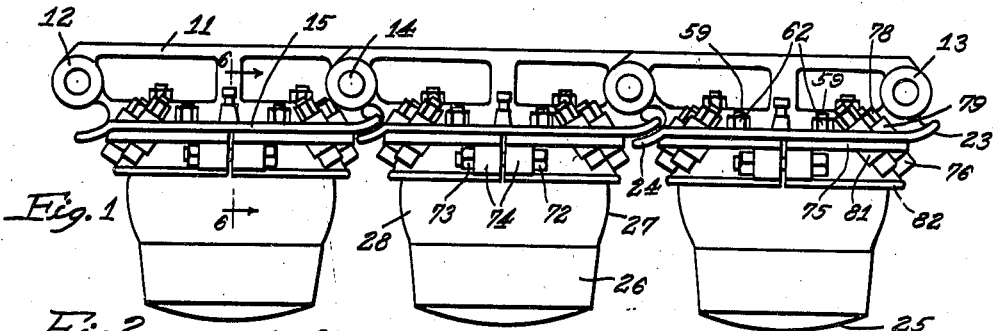
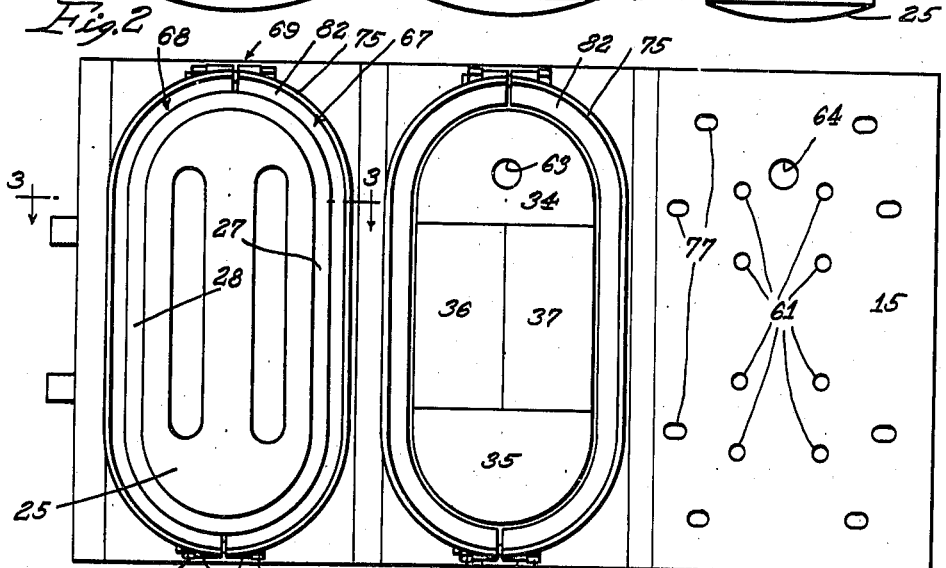
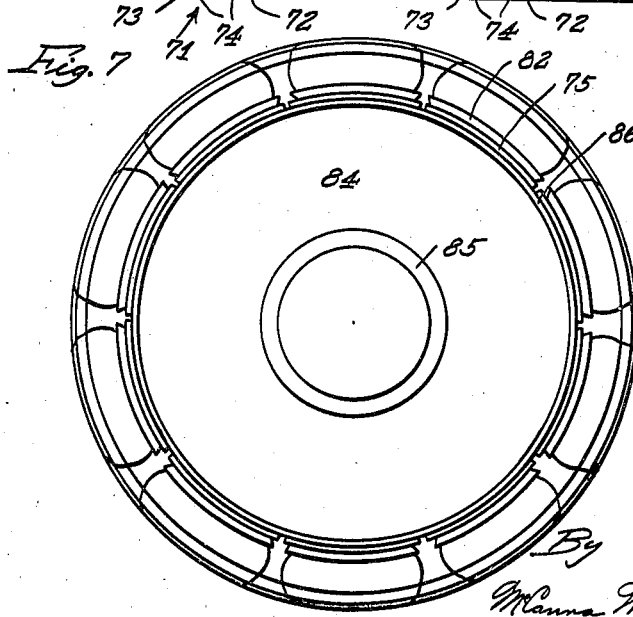
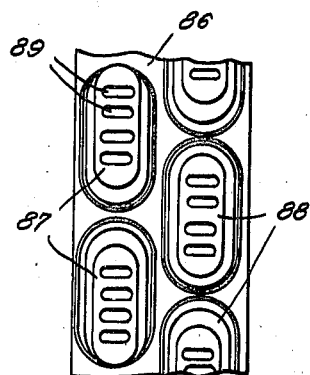
Inventor:
Gabriel Aukland
By Manna, Wintercorn & Horsbach
Attys.

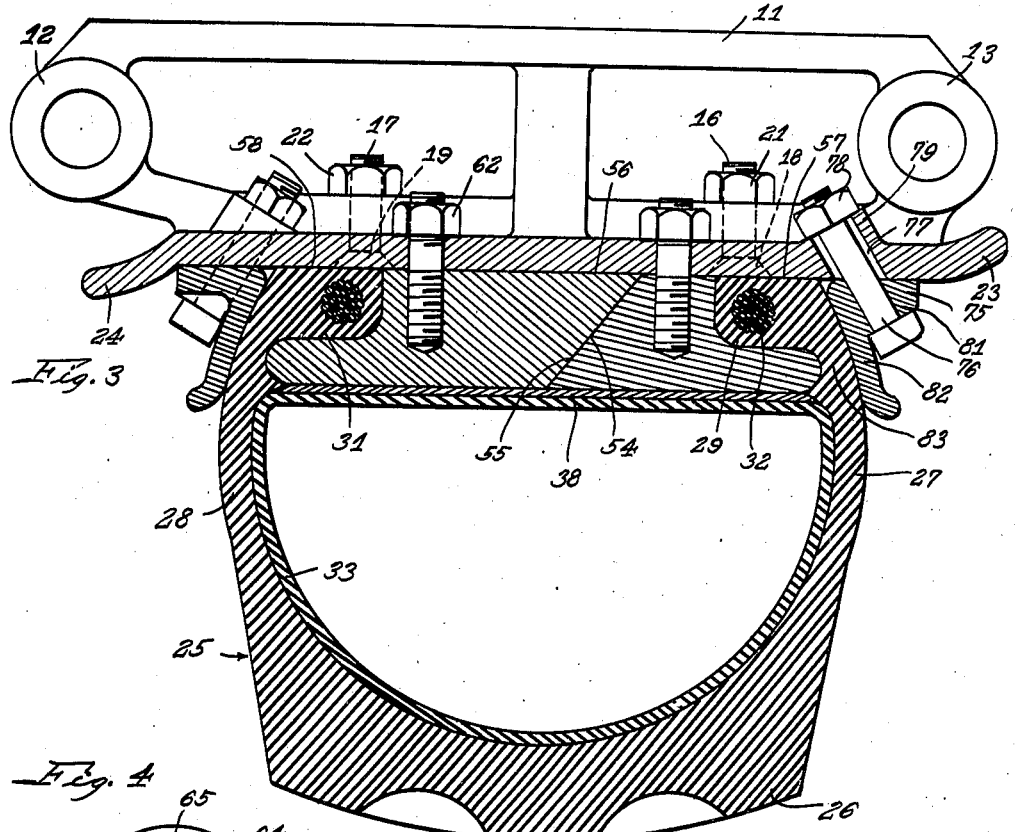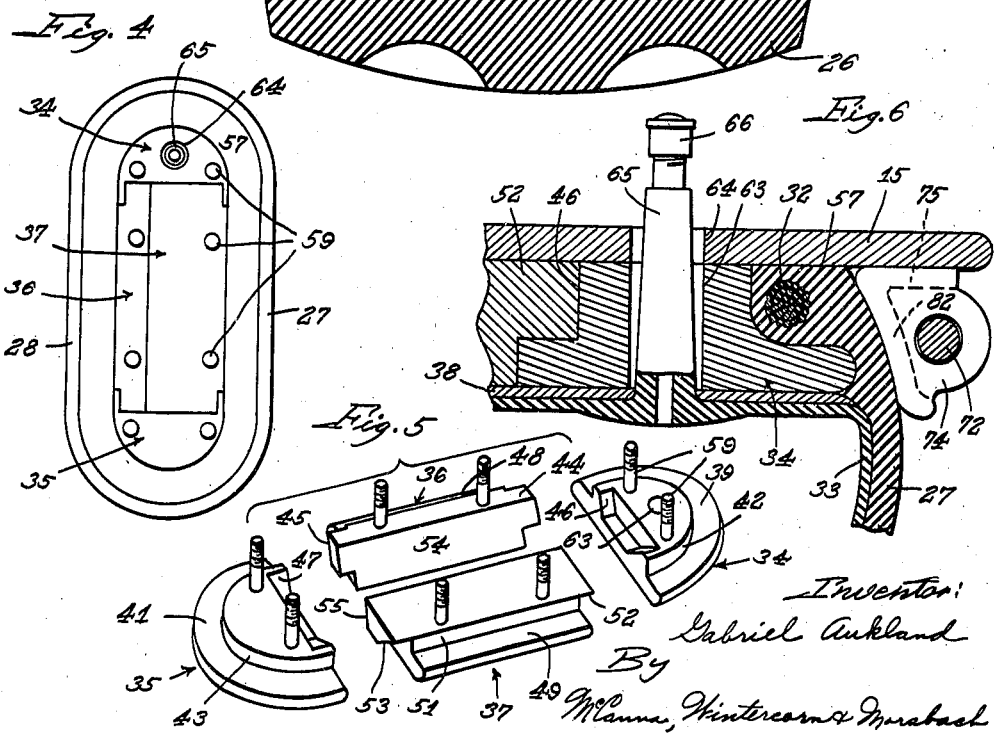

Patented Sept. 2, 1941

2,254,787

UNITED STATES PATENT OFFICE 2,254,787

TRACTOR TIRE

Gabriel Aukland, Rantoul, Ill.

Application September 29, 1939, Serial No. 297,062

11 Claims. (Cl. 305—10)

This invention relates to pneumatic tractor tires and has special reference to a tire and supporting structure particularly applicable to tractors of the track type though not strictly limited thereto.

The advantages accruing from the use of pneumatic tires are now well known in the art, and most common type tractors are now so equipped. However, so far as I know, no adequate structure has been developed for fitting track-type tractors with pneumatic tires, though equal or greater advantage accrues from doing so.

An important object of the invention is the provision of pneumatic track tires or shoes for track-type tractors of improved design.

A further object of the invention is the provision of a generally improved tire construction for heavy duty vehicles.

I have also aimed to provide an improved form of track shoe adapted to replace the standard shoe and to provide pneumatic support of the tractor on the roadway.

I have also aimed to provide an improved pneumatic support for tractors and improved means for applying the support to the tractor.

Other objects and advantages will appear from the following description and the accompanying drawings, in which—

Figure 1 is a side view of a tractor track embodying my invention;

Fig. 2 is a bottom view of that portion of the track shown in Figure 1 showing different parts of the structure removed;

Fig. 3 is a section on the line 3—3 of Fig. 2;

Fig. 4 is a view of the inner face of the tire with the tire blocks in position, ready to be applied to the shoe;

Fig. 5 is an expanded view of the tire blocks;

Fig. 6 is a section on the line 6—6 of Figure 1;

Fig. 7 is a side view of a rim and tire arrangement suitable for wheeled vehicles, and Fig. 8 is a view looking at the tread of the form shown in Fig. 7.

The invention contemplates a construction in which the conventional shoe of track-type tractors and the like shall be replaced by a shoe arranged to carry a pneumatic tire somewhat in the nature of a pad, the length of the tire extending transversely of the track. It will be understood, of course, that the track shoes may either be made integral with the links of the chain or may be formed separately and bolted thereto, both of which structures are now common practice in the art.

In Figure 1 I have shown a section of a track such as employed on track-type tractors including three chain links and attached shoes in which each of the links and shoes are identical in construction and include a chain link 11 having bearings at its opposite end as shown at 12 and 13 for attachment to the next succeeding links of the chain by means of pins 14 in the usual fashion. The shoe, designated generally by the numeral 15, is in this instance attached to the link by means of a plurality of bolts 16 and 17 having heads 18 and 19 countersunk in the surface of the plate, as best shown in Fig. 3, and nuts 21 and 22 threaded onto the bolts and bearing against the link. The shoe in conformity with the required practice has an inturned lip 23 on one edge thereof and an outturned lip 24 on the opposite edge thereof to permit of the required relative movement between the shoes as the shoes pass through their orbit on the tractor. A pneumatic tire designated generally by the numeral 25 is seated on each of said plates, the length of the tire extending transversely of the track in the manner shown in Fig. 2, the tire having the cross-sectional shape shown in Fig. 3 and having a tread 26 on the outer face thereof, flexible side walls 27 and 28 and inturned beads 29 and 31. The beads extend inward somewhat further than is conventional in the case of pneumatic tires and have a wire core 32 extending around the bead for the purpose of reinforcing the same. Positioned within the tire 25 is a bladder 33 analogous in function to the inner tube of conventional tires and serving to retain the inflating air.

A plurality of blocks are inserted in the base of the tire and has a portion extending into the tube and over the bead thereof around the periphery of the tire and a portion filling the space between the bead and extending flush with the contact surface of the bead as shown in Fig. 3. These blocks constitute a portion of the tire attaching means which are formed in sections to facilitate its insertion into the base of the tire. These sections are best shown in Fig. 5 and include end portions 34 and 35 and intermediate portions 36 and 37 interfitting in a manner which will be apparent from Figs. 3 and 4. In assembling the tire on the plate 15 the bladder 33 is inserted into the tire followed by a liner 38, and thereafter the blocks are seated in the open face of the tire by first inserting the end blocks 34 and 35 between the bead at the ends of the tire and rotating these blocks so that the flanges 39 and 41 thereof move under the bead and against the inner surface thereof and until the shoulders 42 and 43 abut against the edge of the bead. Thereafter the block 36 is inserted between the end blocks so that the interlocking portions 44 and 45 thereof seat in recesses 46 and 47 of the end blocks 34 and 35 and so that the flange 48 slips under the bead and into contact with the inner surface thereof. Thereafter the block 37 is inserted by sliding the flange portion 49 under the bead so that the shoulder portion 51 thereof abuts against the edge of the bead, the interlocking portions 52 and 53 seat into the recesses 46 and 47, and the faces 54 and 55 of the blocks 36 and 37 seat against each other so as to fill the space between the bead and produce a flush outer surface as shown at 56 flush with the faces 57 and 58 of the bead so as to provide a flat shoe engaging surface across the length and width of the bead and the blocks.

The blocks each carry a pair of lag screws 59 which, when the tire is seated against the shoe, pass through openings 61 in the plate 15 and receive nuts 62 on the back side of the plate so as to draw the blocks and the tire firmly against the face of the plate and hold the same in position. The section 34 has an opening 63 therethrough, and the plate 15 has an opening 64 for the passage of a valve stem 65 of conventional form, which stem is integral with the ladder 33, the stem having the usual cap 66 and enclosed valve for the purpose of inflating the bladder.

Cooperating with the block for the purpose of holding the tire in position on the shoe is a rim formed in two sections indicated by the numerals 67 and 68. These sections are joined together as shown at 69 and 71, at opposite ends of the tire, by means of bolts 72 and nuts 73 passing through flanges 74 on the adjacent ends of the sections 67 and 68, the sections being slightly smaller than the annulus of the tire so that the bolts may act to draw the bead inward against the shoulder of the block and confine the side wall of the tire between the rim and the flange of the block, as will be apparent from Fig. 3. The rim has the cross-sectional shape shown in Fig. 3 including a base portion 75 adapted to seat against the outer surface of the plate 15 and having openings for the passage of bolts 76 which extend through openings 77 in the plate at an angle converging toward the center of the plate, the bolts having nuts 78 which seat against bosses 79 in drawing the rim tight. The rim also has bosses 81 surrounding the bolt holes for contact of the heads of the bolts. The openings 77 in the plate are somewhat oval in cross-section, as will best appear from Figs. 2 and 3, so as to permit of adjustment of the position of the rim sections in response to tightening of the bolts 72. The rims also have an upstanding tire-engaging portion 82 which bears against the side walls of the tire and acts to compress the side walls in the area between the flange of the block and the wall 82, that is, in the area designated 83 in Fig. 3. It will be seen that the rim thus prevents lateral movement of the bead of the tire outwardly and also serves to prevent the bead from being pulled from under the flange of the block, since the space between the flange and the rim portion 82 is substantially less than the thickness of the bead.

Thus I have provided a tractive device for track-type tractors and the like which may be placed on standard type tractors or devices now in service simply by replacing the present track shoes. On the other hand, in the construction of new tractors, shoes suitable for carrying the tires may either be formed integral with the chain links, or may be made removable therefrom so that where desired the operator may remove the pneumatic tires and substitute the conventional lugs either by fastening the lugs directly to the plate 15 or by substituting an entirely new shoe, depending upon whether or not the plate 15 is formed integral with the chain links. It will be seen that by my improved construction I provide a pneumatically cushioned footing for the tractor without in any way impairing the advantages common to track-type tractors, since the pneumatic pads are susceptible of gripping the earth surface with the same or greater efficiency than the older type of metallic lugs. The structure is such as to firmly retain the tires or pads in position under the tractive force of the vehicle. It will also be observed that because of the multiplicity of pads or tires which simultaneously contact the ground a puncture or damage to one of the pads will not seriously interfere with the operating efficiency of the vehicle.

In Figs. 7 and 8 I have shown the manner in which analogous tire structures may be applied to conventional cylindrical wheels. In this form of the invention the numeral 84 designates a metal wheel having a hub 85 for attachment to a conventional axle, the periphery of the wheel being provided with a cylindrical face 86. The surface 86 is provided with a plurality of holes for the attachment of at least two rows of pads 87 and 88, so arranged that the pads of one row span the junction between the pads of the adjacent row, as best shown in Fig. 8. These pads and the pad-attaching mechanism are identical in structure to that shown in Figs. 3 to 5, inclusive, though slightly smaller in size, each being held in position by blocks similar to those shown in Fig. 5 and by a rim similar to that shown in the previous views. Advantageously the markings 89 on the tread of the tires is shifted in position so as to rest at right angles to the direction of travel.

The form of the invention shown in Figs. 7 and 8 is advantageous in certain special cases for the reason that it provides better tractive engagement with the ground combined with the resiliency of a pneumatic cushion. It has the further advantage that the efficiency of the wheel is substantially unimpaired by a puncture in one of the pads or even a considerable number of pads where the punctured pads are not in juxtaposition.

While I have described and illustrated specific embodiments of the invention, these are by way of illustration and not limitation, and I do not wish to be limited except as required by the prior art and the scope of the appended claims, in which I claim:

1. The combination in a tractive device for vehicles, of an endless tire carrying element, and a plurality of tires secured thereto for supplying resilient support for said vehicle; said tires being spaced for simultaneous engagement with the earth by more than one tire, each of said tires comprising a hollow casing having a tread approaching the rectangular in shape, supporting side walls and an inwardly extending peripheral bead defining an opening and adapted to seat against said element, an inflatable bladder within said casing, means for securing the bead to said element comprising a plurality of interfitting blocks shaped when assembled to fill said opening within the bead and having a peripheral flange extending laterally therefrom behind the bead and in spaced relation to said element, means for securing said blocks to said element to confine the bead between the flange and said element, and a rim secured to said element annularly of the bead and bearing against said side walls to confine the bead against lateral movement.

2. The combination in a track-type tractor of a plurality of track shoes connected together to form an endless track, each of said shoes having an outer tire-receiving portion, a pneumatic tire seated on the tire-receiving portion of each of said shoes, said tire comprising a casing of substantially greater width than length, the width of the tire extending across the track transversely of its direction of travel having a reinforced bead adapted to seat against said portion and an inner tube, said bead defining a relatively large base opening approaching the rectangular in shape, means receivable within the casing having a central portion seating against said tire receiving portion and an annular shoulder in spaced relation thereto for receiving said bead and confining said bead against said portion, and means engaging the outer surface of the tube the distance between said means receivable in said casing and said means engaging the outer surface thereof being substantially less than the width and thickness of said bead for preventing the bead from moving in a direction parallel with or away from said tire-receiving portion.

3. The combination in a pneumatic tire structure for track-type tractors having a track chain, of tire supporting members secured to the links of said chain, a pneumatic tire seated on each of said supporting members comprising a casing having an open base and an inwardly extending reinforced bead, and an inflatable tube within said casing, means seated against said tire-supporting members for securing said bead against said supporting member received within and removable from the opening defined by the bead and extending into the casing and outwardly over the bead to confine the bead between said supporting member and said means, and a rim removably secured to said supporting member in spaced relation to said means and bearing against the side walls of the casing the distance between said rim and said bead securing means being less than the width and thickness of the bead to confine the bead against lateral movement to prevent movement of the bead with respect to the supporting member when tractive force is applied to the tire therethrough.

4. The combination in a pneumatic tire structure for track-type tractors having a track chain, of tire supporting members secured to the links of said chain, a pneumatic tire seated on each of said supporting members comprising a hollow casing having a tread approaching the rectangular in shape, supporting side walls and an inwardly extending peripheral bead defining an opening and adapted to seat against said member, an inflatable tube within the casing, means for securing the bead to said member comprising a plurality of interfitting blocks shaped when assembled to fill said opening within the bead and having a peripheral flange extending laterally therefrom behind the bead and in spaced relation to said member, means for securing said blocks to said member to confine the bead between the flange and said member, and a rim secured to said member annularly of the bead and bearing against the side walls to confine the bead against lateral movement.

5. The combination in a pneumatic tire structure for track-type tractors having a track chain, of tire supporting members secured to the links of said chain, a pneumatic tire seated on each of said supporting members comprising a hollow casing having a tread approaching the rectangular in shape, supporting side walls and an inwardly extending peripheral bead defining an opening and adapted to seat against said member, an inflatable tube within the casing, means for securing the bead to said member comprising a plurality of interfitting blocks shaped when assembled to fill said opening within the bead and having a peripheral flange extending laterally therefrom behind the bead and in spaced relation to said member, means for securing said blocks to said member to confine the bead between the flange and said member, and a rim secured to said member annularly of the bead and bearing against the side walls to confine the bead against lateral movement, said bead having a greater thickness than the distance between said flange and said rim to prevent the bead from passing therebetween when tractive force is applied to the tire.

6. The combination in a pneumatic tire structure for track-type tractors having a track chain, of tire supporting members secured to the links of said chain, a pneumatic tire seated on each of said supporting members comprising a hollow casing having a tread approaching the rectangular in shape, supporting side walls and an inwardly extending peripheral bead defining an opening and adapted to seat against said member, an inflatable tube within the casing, means for securing the bead to said member comprising a plurality of interfitting blocks shaped when assembled to fill said opening within the bead and having a peripheral flange extending laterally therefrom behind the bead and in spaced relation to said member, means for securing said blocks to said member to confine the bead between the flange and said member, a rim secured to said member annularly of the bead and bearing against the side walls to confine the bead against lateral movement, and means extending through said blocks and said member for inflating the tube.

7. The combination recited in claim 4 wherein said blocks comprise a pair of end blocks, and a pair of centrally disposed interfitting blocks interfitting with said end blocks to provide plane faces on the opposite sides thereof.

8. The combination in a tractive device for vehicles, of an endless tire-carrying element, and a plurality of tires secured thereto for supplying resilient support to said vehicle, said tires being spaced for simultaneous engagement with the earth by more than one tire, each of said tires comprising a hollow casing having a tread approaching the rectangular in shape, supporting side walls and an inwardly extending peripheral bead defining an opening and adapted to seat against said element, and means for securing said bead to said element comprising a retaining member spanning said opening and seating over said bead for supporting the inner side of said bead and a rim for engaging the outer side of said bead and side walls, the distance between said rim and said retaining member being less than the width and thickness of said bead to prevent the bead from passing therebetween, said rim comprising a two-part split ring conforming to the outer shape of said bead, and means for connecting the two parts of said ring together to compress the bead.

9. The combination recited in claim 8 wherein bolts are provided for attaching said rim to said tire-carrying element, and said rim and tire-carrying element are provided with abutment means to dispose said bolts at an angle converging on the side of said element opposite said tires.

10. The combination in a tractive device for vehicles, of a wheel having a rim, a plurality of tires secured to said rim for supplying resilient support for said vehicle, said tires being arranged in a plurality of rows extending circumferentially of said rim, the tires of each row being circumferentially spaced and being offset circumferentially from the tires of the adjacent row whereby the central portion of the tires of one row is opposite the space between the tires of the adjacent row to provide continuous and uniform contact of the tires against a supporting surface, each of said tires comprising a hollow casing having a tread approaching the rectangular in shape, and having a curvature peripherally of said rim concentric with the curvature of said rim supporting side walls and an inwardly extending peripheral bead attached in fixed relation throughout its length against said rim, and individual tire retaining means for each tire comprising retaining members on the inner and the outer sides of said bead secured to said rim and spaced to prevent the passage of the bead therebetween each tire extending a relatively small proportion of the distance along the periphery of the wheel.

11. The combination in a tire structure of a casing of composite rubber and fabric having a tread approaching the rectangular in shape, upright side walls around the periphery of said tread, and an inwardly projecting bead along the edge of said side walls opposed to said tread, said bead having a greater width and thickness than the thickness of said side wall adjacent thereto and defining a bottom opening approaching the rectangular in shape, for the reception of a retaining member in said opening and over said bead into close proximity to the inner surface of said side walls, the tread, side walls and bead defining with said retaining member an inflation chamber, said bead having a reinforcement of stranded wire and providing a shoulder within the chamber for engagement by supporting means on the inner and outer surface of the bead.

GABRIEL AUKLAND.